US012749809B2

(12) United States Patent
Wakafuji

(10) Patent No.: US 12,749,809 B2
(45) Date of Patent: Sep. 29, 2026

(54) RADIO WAVE CONTROL SYSTEM, CONTROL APPARATUS, RADIO WAVE CONTROL METHOD, AND NON-TRANSITORY COMPUTER READABLE MEDIUM

(71) Applicant: NEC Corporation, Tokyo (JP)

(72) Inventor: Kenji Wakafuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 66 days.

(21) Appl. No.: 18/845,470

(22) PCT Filed: Mar. 22, 2022

(86) PCT No.: PCT/JP2022/013163

§ 371 (c)(1),
(2) Date: Sep. 10, 2024

(87) PCT Pub. No.: WO2023/181118

PCT Pub. Date: Sep. 28, 2023

(65) Prior Publication Data

US 2025/0202108 A1 Jun. 19, 2025

(51) Int. Cl.
*H01Q 3/34* (2006.01)
*H01Q 3/46* (2006.01)
(Continued)

(52) U.S. Cl.
CPC ................. *H01Q 3/34* (2013.01); *H01Q 3/46* (2013.01); *H04B 1/04* (2013.01); *H04B 7/0617* (2013.01); *H04B 2001/0408* (2013.01)

(58) Field of Classification Search
CPC ... H01Q 3/34; H01Q 3/46; H04B 1/04; H04B 7/0617; H04B 2001/0408; H04B 7/0413; H04B 7/06
See application file for complete search history.

(56) References Cited

U.S. PATENT DOCUMENTS

2005/0156743 A1* 7/2005 Gallivan ............. F41H 13/0068 340/541
2013/0063224 A1* 3/2013 Saji ........................ H04B 1/525 333/132
2024/0267081 A1* 8/2024 D'Ambrosio ....... G06F 13/4247

FOREIGN PATENT DOCUMENTS

JP 2007-518198 A 7/2007
JP 2007-274089 A 10/2007
(Continued)

OTHER PUBLICATIONS

An overview of reconfigurable antennas: Design, simulation, and optimization, in IEEE 10th Annual Wireless and Microwave Technology Conference, Clearwater, Fl, USA, 2009, pp. 1-5 (Year: 2009).*

(Continued)

*Primary Examiner* — Alexander H Taningco
*Assistant Examiner* — Jose A. Miranda Gonzalez
(74) *Attorney, Agent, or Firm* — Sughrue Mion, P.LLC

(57) ABSTRACT

A radio wave control system according to the present disclosure includes a high power amplifier that generates broadband local signals including a first local signal having a first frequency and a second local signal having a second frequency, a reflective plate that modulates, when the first local signal and the second local signal are reflected by or transmitted through periodically disposed antenna elements, the first local signal and the second local signal, and beamforms the first modulated signal and the second modulated signal in respectively different directions, and a control apparatus that controls directions in which the first modulated signal and the second modulated signal are beamformed by electrically controlling the antenna elements and controlling phases of the first local signal and the second local signal incident on the reflective plate.

12 Claims, 6 Drawing Sheets

(51) Int. Cl.
*H04B 1/04* (2006.01)
*H04B 7/06* (2006.01)

(56) References Cited

FOREIGN PATENT DOCUMENTS

| | | | | | |
|---|---|---|---|---|---|
| JP | 2008193721 | A | * | 8/2008 | ............. H04B 1/005 |
| JP | 2013-175800 | A | | 9/2013 | |
| JP | 2021040247 | A | * | 3/2021 | ............... H04B 1/04 |
| WO | WO-2021024611 | A1 | * | 2/2021 | ............ H04W 28/18 |
| WO | 2021/106043 | A1 | | 6/2021 | |

OTHER PUBLICATIONS

JP Office Action for JP Application No. 2024-508847, mailed on Mar. 4, 2025 with English Translation.
International Search Report for PCT Application No. PCT/JP2022/013163, mailed on Jun. 14, 2022.
Hong, Wei et al., Multibeam Antenna Technologies for 5G Wireless Communications, IEEE Transactions on Antennas and Propagation, vol. 65, No. 12, Jun. 7, 2017.

* cited by examiner

RADIO WAVE CONTROL SYSTEM, CONTROL APPARATUS, RADIO WAVE CONTROL METHOD, AND NON-TRANSITORY COMPUTER READABLE MEDIUM

This application is a National Stage Entry of PCT/JP2022/013163 filed on Mar. 22, 2022, the contents of all of which are incorporated herein by reference, in their entirety.

TECHNICAL FIELD

The present disclosure relates to a radio wave control system, a control apparatus, a radio wave control method, and a program.

BACKGROUND ART

In wireless communication, beamforming is used to expand a coverage area of a base station apparatus. Beamforming makes it possible to emit radio waves in a specific direction.

Patent Literature 1 discloses a beamforming technique that uses a reflector array and a transmitter array. Specifically, Patent Literature 1 discloses a configuration of a radio transmission system including a main station transmission unit and a base station transmission unit. The main station transmission unit transmits an optical signal, which is intensity-modulated by an RF signal, to the base station transmission unit via an optical fiber. The base station transmission unit demodulates the RF signal to be superimposed on the optical signal by converting the optical signal into an electrical signal, and transmits the radio wave of the RF signal from a transmission antenna to the reflector array. The radio wave of RF signal reflected by the reflector array is intensified in phase with respect to a specific direction, and a transmission beam is formed in the specific direction.

CITATION LIST

Patent Literature

Patent Literature 1: International Patent Publication No. WO2021/106043

SUMMARY OF INVENTION

Technical Problem

Patent Literature 1 discloses a beamforming technique for a single RF signal. On the other hand, a radio access network (RAN) sharing method for transmitting signals of a plurality of communication carriers from one base station has been studied. Frequencies allocated to respective communication carriers are different. Therefore, in a case in which a plurality of communication carriers use a single base station, the base station needs to transmit a plurality of RF signals having different frequencies, and further needs to form different communication areas for respective communication carriers. However, Patent Literature 1 only discloses a beamforming technique for a single RF signal, and has a problem that it is difficult to apply it to a base station that uses a plurality of RF signals having different frequencies.

In light of the above-described problems, it is an object of the present disclosure to provide a radio wave control system, a control apparatus, a radio wave control method, and a program, which are capable of performing beamforming related to a plurality of signals having different frequencies.

Solution to Problem

A radio wave control system according to a first aspect of the present disclosure includes a high power amplifier configured to generate broadband local signals including a first local signal having a first frequency and a second local signal having a second frequency, a reflective plate configured to modulate, when the first local signal and the second local signal are reflected by or transmitted through periodically disposed antenna elements, the first local signal and the second local signal, and beam-form the first modulated signal and the second modulated signal in respectively different directions, and control means for controlling directions in which the first modulated signal and the second modulated signal are beam-formed by electrically controlling the antenna elements and controlling phases of the first local signal and the second local signal incident on the reflective plate.

A control apparatus according to a second aspect of the present disclosure includes signal generation means for generating an information signal, and control means for controlling, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate.

A radio wave control method according to a third aspect of the present disclosure generating an information signal, and controlling, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate.

A program according to a fourth aspect of the present disclosure causes a computer to execute: generating an information signal, and controlling, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate.

Advantageous Effects of Invention

According to the present disclosure, it is possible to provide a radio wave control system, a control apparatus, a radio wave control method, and a program, which are capable of performing beamforming related to a plurality of signals having different frequencies.

EXAMPLE EMBODIMENT

First Example Embodiment

Figure 1:
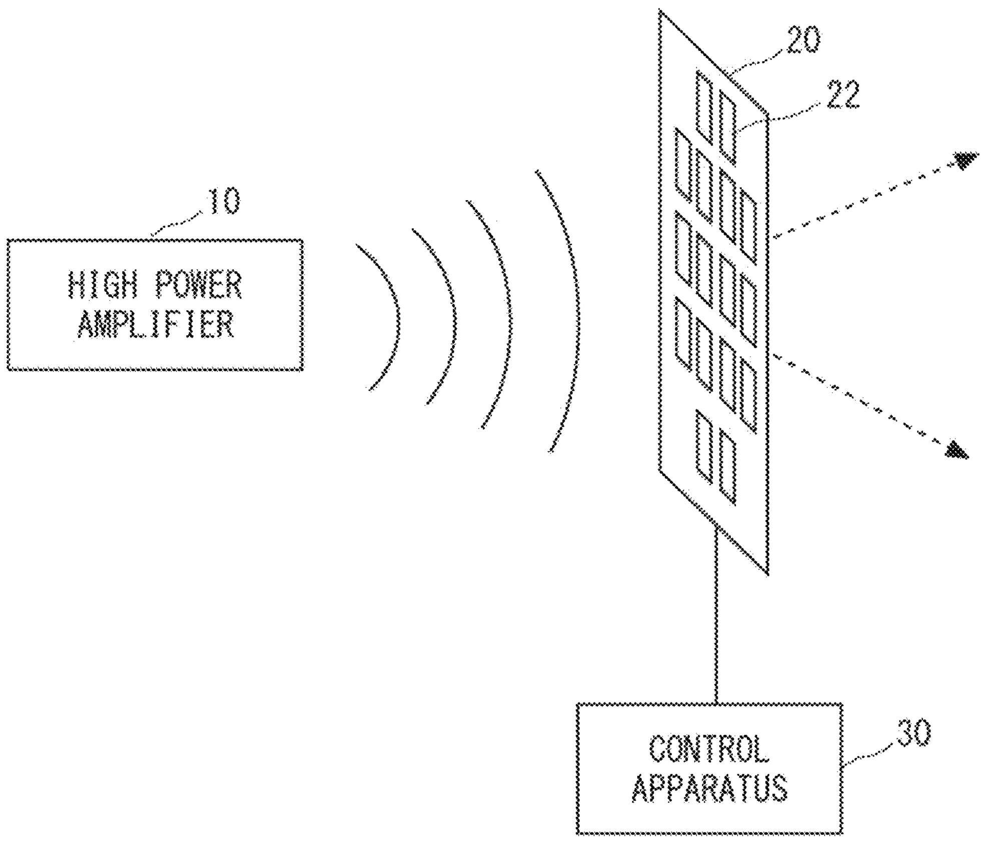
FIG. 1 is a configuration diagram of a radio wave control system according to a first example embodiment.

Example embodiments of the present disclosure will be described below with reference to the drawings. A configuration example of a radio wave control system according to a first example embodiment will be described with reference to FIG. 1. The radio wave control system in FIG. 1 includes a high power amplifier 10, a reflective plate 20, and a control apparatus 30. The control apparatus 30 may be a computer apparatus that operates when a processor executes a program stored in a memory.

The high power amplifier 10 generates broadband local signals including a first local signal having a first frequency and a second local signal having a second frequency. The high power amplifier 10 transmits the generated broadband local signals toward the reflective plate 20.

The first frequency and the second frequency may be, for example, frequencies included in a band used for mobile communication. The first frequency may be, for example, a center frequency included in a certain frequency band. The second frequency may also be a center frequency included in a certain frequency band. Further, the first frequency and the second frequency may be different center frequencies in the same frequency band. Alternatively, the first frequency may be included in a frequency band different from the frequency band in which the second frequency is included.

The local signal may be a signal having the same frequency as the frequency of the carrier wave. The local signal may be a signal used to convert a frequency of an information signal into a frequency for transmission as a radio signal.

The broadband local signals may include, for example, local signals of a plurality of frequencies available to a plurality of communication service providers. For example, in a case in which a communication service provider A can use the first frequency and a communication service provider B can use the second frequency, the broadband local signals may include signals including the first frequency and the second frequency. The fact that the communication service provider A can use the first frequency may be alternatively expressed as that the first frequency being allocated to the communication service provider A.

For example, a traveling wave tube (TWT) may be used as the high power amplifier 10. The traveling wave tube generally has a wider specific band than a semiconductor such as silicon, and can amplify a signal with high output and high efficiency.

The reflective plate 20 reflects or transmits the first local signal and the second local signal in periodically disposed antenna elements 22. At this time, the reflective plate 20 modulates the first local signal and the second local signal, and beam-forms the first modulated signal and the second modulated signal in respectively different directions. Dotted arrows in FIG. 1 indicate that a first modulated signal and a second modulated signal are beam-formed in different directions.

The reflective plate 20 may be, for example, a meta-surface reflective plate using a meta-surface technique. For example, the reflective plate 20 may be a reconfigurable intelligent surface (RIS) reflective plate.

The antenna element 22 is disposed on the surface of the reflective plate 20. The antenna element 22 is an element capable of realizing any dielectric constant and magnetic permeability. The antenna element 22 is a structure sufficiently small with respect to the wavelength of the radio wave, and may be, for example, a patch antenna. Furthermore, whether the reflective plate 20 operates as a reflective plate that reflects the radio waves or operates as a reflective plate that transmits the radio waves may be determined depending on a material used for the antenna element 22. Alternatively, whether the reflective plate 20 operates as a reflective plate that reflects the radio waves or operates as a reflective plate that transmits the radio waves may be controlled by overlapping a glass substrate onto the antenna element and adjusting the distance between the glass substrate and the antenna element.

Beamforming is a state in which the radio waves reflected by or transmitted through a plurality of antenna elements 22 overlap each other and the radio waves have directivity in a specific direction. That is, a radio wave having directivity in a specific direction is a state in which a composite wave of radio waves reflected by or transmitted through a plurality of antenna elements 22 forms a beam. The reflective plate 20 transmits or reflects the radio wave such that a direction of directivity of the radio wave carrying the first modulated signal is different from a direction of directivity of the radio wave carrying the second modulated signal.

The modulated signal is a signal which is generated by modulating a carrier wave by using an information signal or the like. The modulated signal may be generated, for example, by changing the phase of the local signal.

The control apparatus 30 controls directions in which the first modulated signal and the second modulated signal are beam-formed by electrically controlling the antenna elements 22 and controlling the phases of the first local signal and the second local signal incident on the reflective plate 20. The control apparatus 30 is an apparatus used as control means that electrically controls the antenna elements 22.

The control apparatus 30 controls a direction in which the first signal and the second signal are beam-formed by electrically controlling a plurality of antenna elements 22 to control the phases of the first signal and the second signal. Controlling a phase of a signal may mean changing the phase of the signal or switching the phase of the signal.

For example, the control apparatus 30 may switch the phase of the radio wave to be reflected or transmitted by controlling a variable resonance circuit incorporated in the reflective plate 20. Alternatively, in a case in which a plurality of materials having different reflection phases is disposed on the surface of the reflective plate 20, the control apparatus 30 may switch the phases of the radio waves to be reflected or transmitted by switching a material used as the antenna element 22. Alternatively, a liquid crystal layer may be provided on the surface of the reflective plate 20, and the control apparatus 30 may control the dielectric constant by changing the voltage applied to the reflective plate 20, thereby switching the phase of the radio wave to be reflected or transmitted. The liquid crystal layer may be disposed for each reflective element.

The control apparatus 30 controls the phase such that the radio wave to be reflected by or transmitted through a plurality of antenna elements 22 becomes a beam having directivity in a specific direction. For example, the control apparatus 30 controls the phase such that the radio wave carrying the first modulated signal becomes a beam having directivity in the first direction. Further, the control apparatus 30 controls the phase such that the radio wave carrying the second modulated signal becomes a beam having directivity in the second direction.

Further, the control apparatus 30 may modulate the first local signal and the second local signal by multiplying the first local signal and the second local signal by the information signal, and generate the first modulated signal and the second modulated signal.

In other words, the control apparatus 30 controls the reflective plate 20 such that the phase rotation amount of the radio wave of the first frequency to be reflected by or transmitted through the reflective plate 20 becomes a specific value. Further, the control apparatus 30 controls the reflective plate 20 such that the phase rotation amount of the radio wave of the second frequency to be reflected by or transmitted through the reflective plate 20 becomes a specific value.

Figure 2:
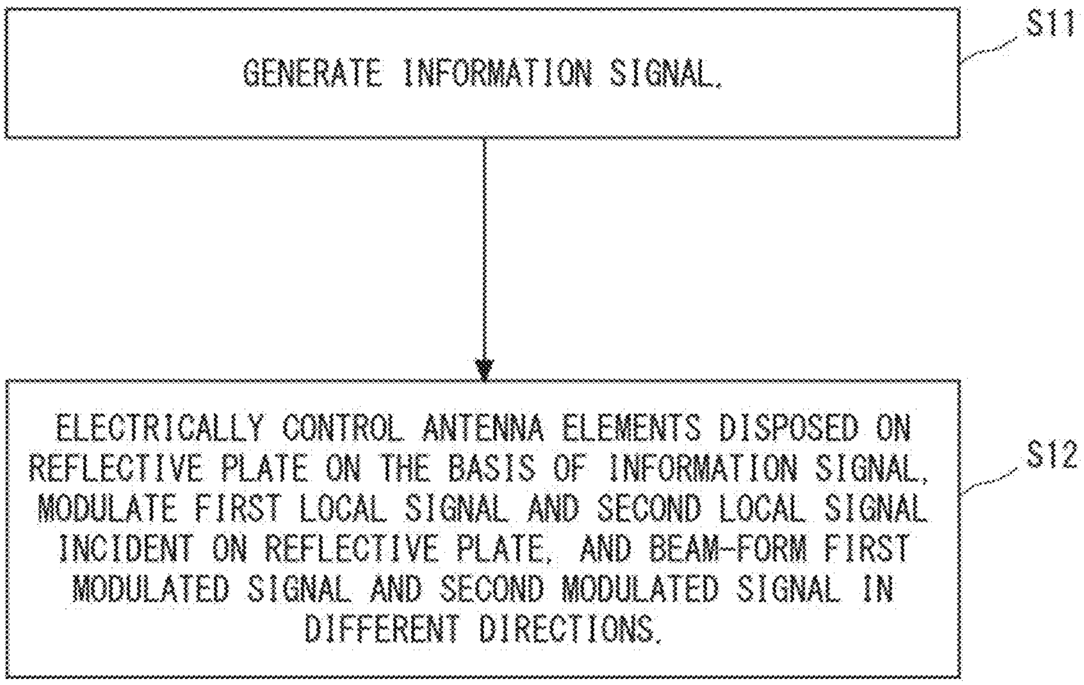
FIG. 2 is a flowchart of a radio wave control method according to the first example embodiment.

Next, a flowchart regarding a radio wave control method in the control apparatus 30 according to the first example embodiment will be described with reference to FIG. 2. The control apparatus 30 generates an information signal (S11). Here, among the broadband local signals transmitted from the high power amplifier 10 to the reflective plate 20, the first local signal and the second local signal are reflected by or transmitted through the antenna elements periodically disposed on the reflective plate 20. At that time, the control apparatus 30 electrically controls the antenna elements 22 on the basis of the information signal. The control apparatus 30 controls directions in which the first modulated signal and the second modulated signal are beam-formed by controlling the phases of the first local signal and the second local signal incident on the reflective plate 20 (S12).

As described above, the radio wave control system according to the first example embodiment performs beamforming of the signals of a plurality of frequencies in different directions by causing the reflective plate 20 to reflect or transmit the broadband local signals transmitted from the high power amplifier 10. Furthermore, the control apparatus 30 can modulate the local signal and further control the direction in which the modulated signal is beam-formed by electrically controlling the antenna elements 22 disposed on the reflective plate 20. As a result, the radio wave control system according to the first example embodiment can cause a plurality of signals having different frequencies to be beam-formed in different directions.

Second Example Embodiment

Next, a configuration example of a radio wave control system according to a second example embodiment will be described with reference to FIG. 3. The radio wave control system of FIG. 3 has a configuration in which a filter 41 and a filter 42 are added to the radio wave control system of FIG. 1. Furthermore, in the radio wave control system of FIG. 3, a transmissive type reflective plate 24 is used as the reflective plate. Hereinafter, detailed description of functions, operations, and the like similar to those of the radio wave control system in FIG. 1 will be omitted. Further, in FIG. 3, two filters, i.e., the filter 41 and the filter 42, are illustrated, but the number of filters is not limited to two. For example, the number of filters used may be equal to or greater than the number of communication service providers that use the radio wave control system.

The filter 41 transmits a local signal of a specific frequency. Specifically, the filter 41 transmits a local signal of a frequency band having a certain width around a specific frequency. The specific frequency may be referred to as a center frequency. Similarly to the filter 41, the filter 42 also transmits a local signal of a specific frequency. The filter 42 may transmit a local signal having the same frequency as the filter 41 or may transmit a local signal having a different frequency. The different frequencies may be frequencies in which the bandwidth of one frequency does not overlap the bandwidth of the other frequency.

Further, a plurality of filters may be grouped by allocating each filter to any one of a plurality of groups. Each group includes at least one or more filters. For example, filters included in a group A may transmit the local signal having the frequency used by the communication service provider A, and filters included in a group B may transmit the local signal having the frequency used by the communication service provider B. That is, the communication service provider may be assigned to each group. Grouping a plurality of filters may be rephrased as grouping the antenna elements that reflect or transmit the local signals transmitted through the respective filters. That is, the antenna elements that reflect or transmit the local signals transmitted through the filters included in the group A may be an antenna element included in the group A.

The local signal transmitted through the filter is transmitted to the transmissive type reflective plate 24. The local signals transmitted to the transmissive type reflective plate 24 are modulated by a plurality of antenna elements 22 disposed on the transmissive type reflective plate 24, and are transmitted through the transmissive type reflective plate 24 as the modulated signals.

The control apparatus 30 includes a signal generation unit 32 and a control unit 34. The signal generation unit 32 and the control unit 34 may be software components or modules whose processing is carried out by causing the processor to execute the program stored in the memory. Alternatively, the signal generation unit 32 and the control unit 34 may be hardware components such as circuits or chips.

The signal generation unit 32 generates the information signal. The information signal may be, for example, a signal indicating text data, a signal indicating image data, or a signal indicating moving image data. The text data, the image data, the moving image data, and the like may be referred to as user data. Alternatively, the information signal may be a signal indicating control data used to control an operation of a wireless terminal held by the user. The signal generation unit 32 outputs the information signal to the control unit 34.

The control unit 34 modulates the local signal incident on the transmissive type reflective plate 24 by using the received information signal. For example, the control unit 34 may modulate the local signal by changing the amplitude of the local signal. Alternatively, the control unit 34 may modulate the local signal by changing the phase of the local signal. Alternatively, the control unit 34 may modulate the local signal by changing the amplitude and the phase of the local signal. In addition, in a case in which a plurality of information signals are received, the control unit 34 may determine in advance which information signal is used to modulate the local signal output from which filter. For example, it may be determined in advance that the information signal related to the communication service provider A is used to modulate the local signal output from the filter included in the group A. Furthermore, the control unit 34 may manage each group and the filters included in each group in association with each other.

Furthermore, the control unit 34 determines the direction in which the modulated signal obtained by modulating the local signal output from the filter included in each group is beam-formed. The direction of beamforming may be indicated by using the phase rotation amount. The phase rotation amount may be, for example, a value indicating an angle between the surface of the reflective plate 20 and the direction of the beam formed by the signal transmitted through.

The control unit 34 electrically controls a plurality of antenna elements 22 disposed on the reflective plate 20 such that the modulated signal becomes the modulated signal modulated using the information signal, and the modulated signal is further beam-formed in the determined direction. Specifically, the control unit 34 may change the voltage to be applied to a plurality of reflective elements such that the modulated signal becomes the modulated signal modulated using the information signal, and the modulated signal is further beam-formed in the determined direction. As the voltage is applied to a plurality of reflective elements, the phase and amplitude of the local signal change.

Figure 3:
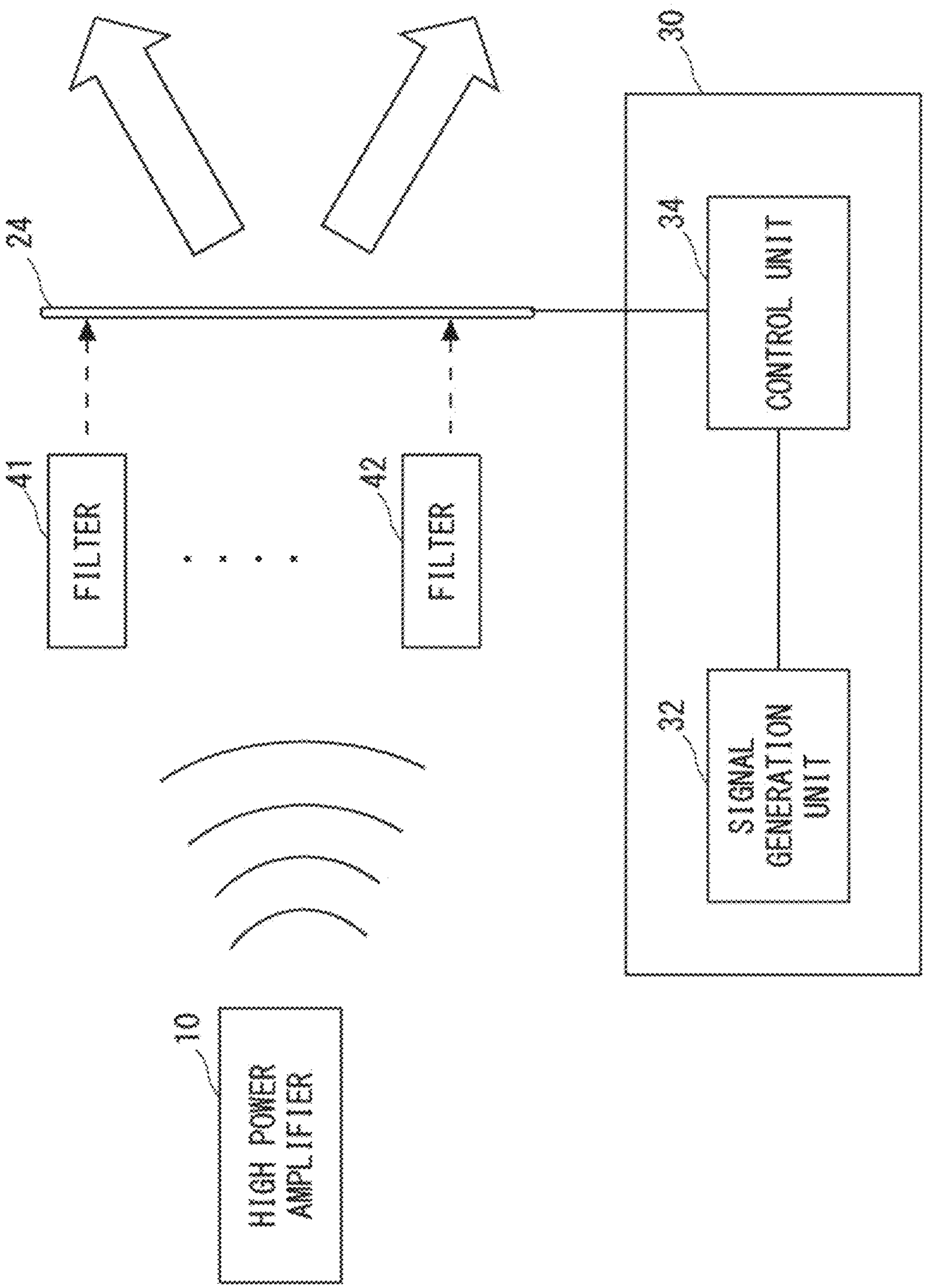
FIG. 3 is a configuration diagram of a radio wave control system according to a second example embodiment.

Solid arrows in FIG. 3 indicate the modulated signal obtained after modulating the local signal by controlling the amplitude and the phase. The solid arrows in FIG. 3 indicate that two modulated signals having different frequencies are beam-formed in different directions.

Figure 4:
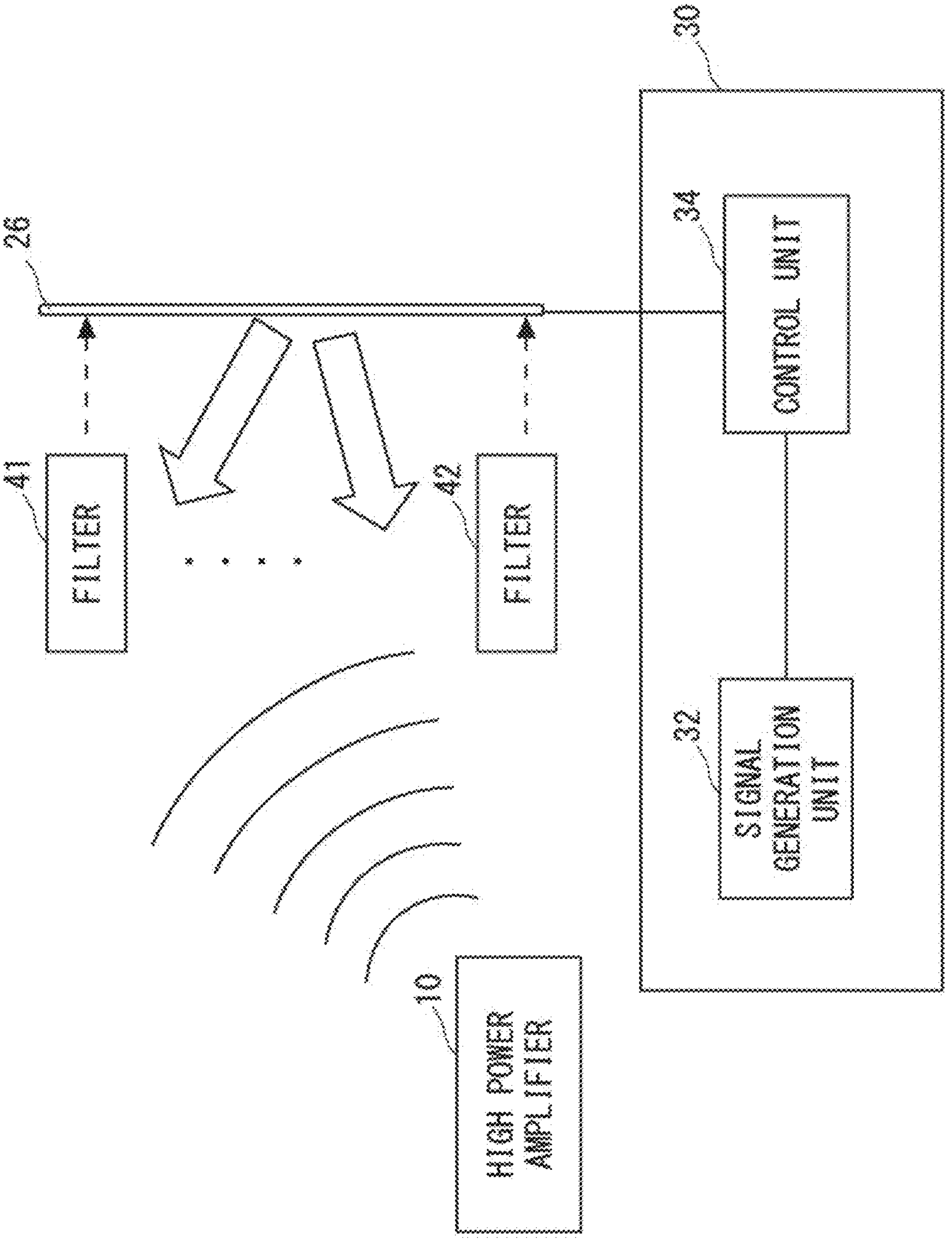
FIG. 4 is a configuration diagram of the radio wave control system according to the second example embodiment.

Although the configuration of the radio wave control system that uses the transmissive type reflective plate 24 as the reflective plate has been described above, a reflective type reflective plate 26 may be used as illustrated in FIG. 4. FIG. 4 illustrates a configuration in which a reflective type reflective plate 26 is used instead of the transmissive type reflective plate 24. Solid arrows in FIG. 4 indicate that the local signals output from the filter 41 and the filter 42 are reflected by the reflective type reflective plate 26 and are beam-formed as the modulated signals. The local signals output from the filter 41 and the filter 42 are modulated when being reflected by the reflective type reflective plate 26, and are beam-formed as the modulated signals.

Figure 5:
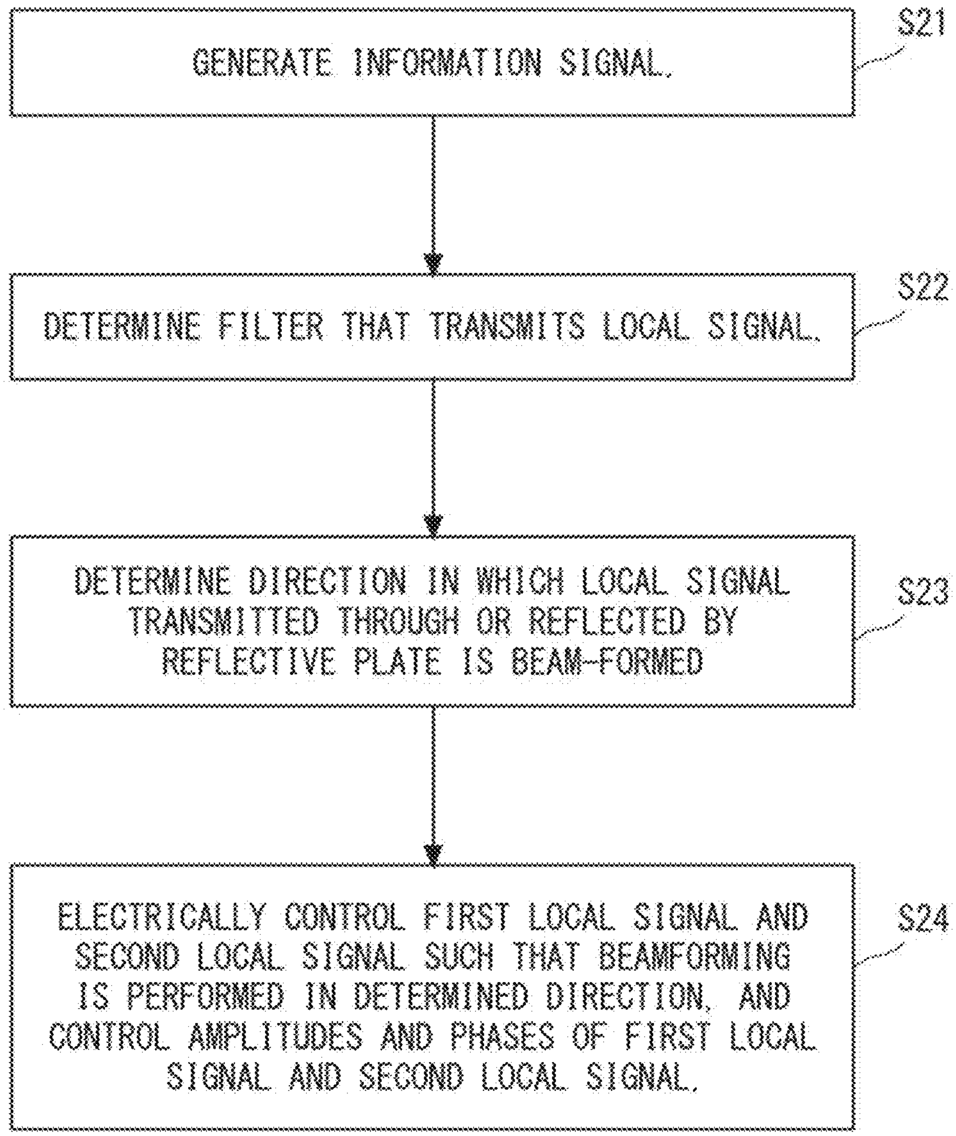
FIG. 5 is a flowchart of a modulation process according to the second example embodiment.

Next, a flow of a modulation process according to the second example embodiment will be described with reference to FIG. 5. First, the signal generation unit 32 generates the information signal (S21). The signal generation unit 32 may generate signals related to the same communication service provider or may generate signals for each communication service provider.

Next, the control unit 34 determines the filter that transmits the local signal (S22). The control unit 34 determines the filter that transmits the local signal having the frequency used by the communication service provider associated with the information signal generated in step S21.

Next, the control unit 34 determines the direction in which the modulated signal that has been transmitted through the transmissive type reflective plate 24 or the modulated signal that has been reflected by the reflective type reflective plate 26 is to be beam-formed (S23). The direction in which the modulated signal is to be beam-formed may be determined for each communication service provider, for example.

Next, the control unit 34 electrically controls a plurality of antenna elements 22 disposed on the reflective plate 20 such that the modulated signal becomes the modulated signal modulated using the information signal, and the modulated signal is further beam-formed in the determined direction (S24). For example, the control unit 34 may set a timing at which the signal related to the communication service provider A is modulated to a timing different from a timing at which the signal related to the communication service provider B is modulated. That is, the control unit 34 may perform time-division control on the signal related to the communication service provider A and the signal related to the communication service provider B.

As described above, the radio wave control system according to the second example embodiment electrically controls a plurality of reflective elements in order to modulate the local signal in the transmissive type reflective plate 24 or the reflective type reflective plate 26. Further, the radio wave control system electrically controls a plurality of reflective elements such that the modulated signal is beam-formed in the determined direction. As a result, the radio wave control system can convert the generated information signal into the frequency of the local signal and transmit the signal in a desired direction.

The radio wave control system illustrated in FIGS. 3 and 4 may constitute a single base station apparatus. A plurality of communication service providers may share a single base station apparatus, which is capable of beam-forming signals of a plurality of frequencies in respectively different directions. As a result, different communication areas may be formed for each communication service provider by using a single base station apparatus.

Furthermore, each filter that transmits the signal of the specific frequency may be provided for each antenna element disposed on the transmissive type reflective plate 24 or the reflective type reflective plate 26. That is, the signal transmitted through one filter may be transmitted through the transmissive type reflective plate 24 or one antenna element 22 disposed on the reflective type reflective plate 26, or may be reflected by one antenna element 22. Alternatively, each filter that transmits the signal of the specific frequency may be associated with two or more antenna elements disposed on the transmissive type reflective plate 24 or the reflective type reflective plate 26. That is, the signal transmitted through one filter may be transmitted through the transmissive type reflective plate 24 or two or more antenna elements 22 disposed on the reflective type reflective plate 26, or may be reflected by two or more antenna elements 22.

Figure 6:
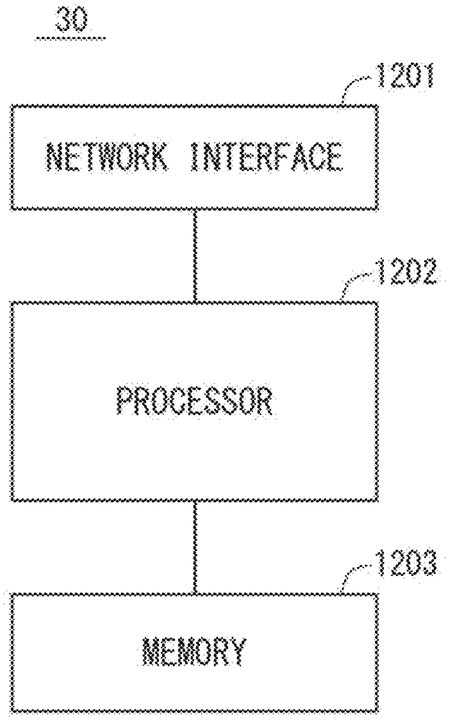
FIG. 6 is a configuration diagram of a control apparatus according to each example embodiment.

FIG. 6 is a block diagram illustrating a configuration example of the control apparatus described in the above-described example embodiment. Referring to FIG. 6, the control apparatus 30 includes a network interface 1201, a processor 1202, and a memory 1203. The network interface 1201 may be used to communicate with network nodes. The network interface 1201 may include, for example, a network interface card (NIC) conforming to IEEE 802.3 series. IEEE represents Institute of Electrical and Electronics Engineers.

The processor 1202 performs the processes of the control apparatus 30 described using the flowcharts in the above-described example embodiments, by reading software (computer programs) from the memory 1203 and executing the software. The processor 1202 may be, for example, a microprocessor, a MPU, or a CPU. The processor 1202 may include a plurality of processors.

The memory 1203 is configured with a combination of a volatile memory and a nonvolatile memory. The memory 1203 may include a storage disposed away from the processor 1202. In this case, the processor 1202 may access the memory 1203 through an input/output (I/O) interface (not shown).

In the example of FIG. 6, the memory 1203 is used to store a software module group. The processor 1202 can perform the processing of the control apparatus 30 described in the above-described example embodiment by reading and executing these software module groups from the memory 1203.

As described with reference to FIG. 6, each of the processors included in the control apparatus 30 in the above-described example embodiments executes one or a plurality of programs including a command group for causing a computer to perform the algorithm described with reference to the drawings.

In the above-described example, the program includes a group of instructions (or software code) for causing a computer to perform one or more functions described in the example embodiments when being read by the computer. The program may be stored in a non-transitory computer readable medium or a tangible storage medium. As an example and not by way of limitation, a computer readable medium or tangible storage medium includes a random-access memory (RAM), a read-only memory (ROM), a flash memory, a solid-state drive (SSD) or other memory technology, a CD-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer readable medium or a communications medium. As an example and not by way of limitation, the transitory computer readable medium or the communication medium includes electrical, optical, acoustic, signals, or propagated signals in other forms.

Note that the technological spirits of the present disclosure are not limited to the above-described example embodiments, and can be appropriately modified without departing from the scope.

Some or all of the above-described example embodiments may be described as in the following Supplementary Notes, but are not limited to the following Supplementary Notes.

Supplementary Note 1

A radio wave control system including:

a high power amplifier configured to generate broadband local signals including a first local signal having a first frequency and a second local signal having a second frequency;

a reflective plate configured to modulate, when the first local signal and the second local signal are reflected by or transmitted through periodically disposed antenna elements, the first local signal and the second local signal, and beam-form the first modulated signal and the second modulated signal in respectively different directions; and control means for controlling directions in which the first modulated signal and the second modulated signal are beam-formed by electrically controlling the antenna elements and controlling phases of the first local signal and the second local signal incident on the reflective plate.

Supplementary Note 2

The radio wave control system according to Supplementary Note 1, further including:

at least one first filter that transmits the first local signal out of the broadband local signals output from the high power amplifier; and at least one second filter that transmits the second local signal out of the broadband local signal output from the high power amplifier, wherein the control means controls the phase of the first local signal that has been transmitted through the first filter, and controls the phase of the second local signal that has been transmitted through the second filter.

Supplementary Note 3

The radio wave control system according to Supplementary Note 1 or 2, wherein the control means controls an amplitude of the first local signal or the second local signal by using an information signal such that the first local signal and the second local signal are modulated.

Supplementary Note 4

The radio wave control system according to Supplementary Note 3, wherein the control means modulates the first local signal by using a first information signal related to a first communication service provider, and modulates the second local signal by using a second information signal related to a second communication service provider.

Supplementary Note 5

The radio wave control system according to any one of Supplementary Notes 2 to 4, wherein the control means allocates each of the antenna elements disposed on the reflective plate to a first group or a second group, controls the phase of the first local signal by using the antenna element allocated to the first group, and controls the phase of the second local signal by using the antenna element allocated to the second group.

Supplementary Note 6

The radio wave control system according to any one of Supplementary Notes 1 to 5, wherein a traveling wave tube is used as the high power amplifier.

Supplementary Note 7

A control apparatus including:

signal generation means for generating an information signal; and control means for controlling, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate.

Supplementary Note 8

The control apparatus according to Supplementary Note 7, wherein the control means controls an amplitude of the first local signal or the second local signal by using an information signal such that the first local signal and the second local signal are modulated.

Supplementary Note 9

The control apparatus according to Supplementary Note 8, wherein
the control means
modulates the first local signal by using a first information signal related to a first communication service provider, and
modulates the second local signal by using a second information signal related to a second communication service provider.

Supplementary Note 10

A radio wave control method including:
generating an information signal; and
controlling, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate.

Supplementary Note 11

A non-transitory computer readable medium having a program stored therein, the program causing a computer to execute:
generating an information signal; and
controlling, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate.

REFERENCE SIGNS LIST

10 HIGH POWER AMPLIFIER
20 REFLECTIVE PLATE
22 ANTENNA ELEMENT
24 TRANSMISSIVE TYPE REFLECTIVE PLATE
26 REFLECTIVE TYPE REFLECTIVE PLATE
30 CONTROL APPARATUS
32 SIGNAL GENERATION UNIT
34 CONTROL UNIT
41 FILTER
42 FILTER

What is claimed is:

1. A radio wave control system comprising:
a high power amplifier configured to generate broadband local signals comprising a first local signal having a first frequency and a second local signal having a second frequency;
a reflective plate configured to:
modulate, when the first local signal and the second local signal are reflected by or transmitted through periodically disposed antenna elements, the first local signal and the second local signal, and
beam-form the first modulated signal and the second modulated signal in respectively different directions;
at least one memory storing instructions; and
at least one processor configured to execute the instructions to:
control directions in which the first modulated signal and the second modulated signal are beam-formed by controlling the antenna elements and controlling phases of the first local signal and the second local signal incident on the reflective plate;
modulate the first local signal by using a first information signal related to a first communication service provider at first timing; and
modulate the second local signal by using a second information signal related to a second communication service provider at second timing different from the first timing.

2. The radio wave control system according to claim 1, further comprising:
at least one first filter that is configured to transmit the first local signal out of the broadband local signals output from the high power amplifier; and
at least one second filter that is configured to transmit the second local signal out of the broadband local signal output from the high power amplifier, wherein
the at least one processor is further configured to execute the instructions to;
control the phase of the first local signal that has been transmitted through the first filter, and
control the phase of the second local signal that has been transmitted through the second filter.

3. The radio wave control system according to claim 2, wherein the at least one processor is further configured to execute the instructions to;
allocate each of the antenna elements disposed on the reflective plate to a first group or a second group,
control the phase of the first local signal by using the antenna element allocated to the first group, and
control the phase of the second local signal by using the antenna element allocated to the second group.

4. The radio wave control system according to claim 1, wherein the at least one processor is further configured to execute the instructions to control an amplitude of the first local signal or the second local signal by using an information signal such that the first local signal and the second local signal are modulated.

5. The radio wave control system according to claim 1, wherein the high power amplifier comprises a traveling wave tube.

6. A control apparatus comprising:
at least one memory storing instructions; and at least one processor configured to execute the instructions to:

generate an information signal;

control, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate;

modulate the first local signal by using a first information signal related to a first communication service provider at first timing, and modulate the second local signal by using a second information signal related to a second communication service provider at second timing different from the first timing.

7. The control apparatus according to claim 6, wherein the at least one processor is further configured to execute the instructions to control an amplitude of the first local signal or the second local signal by using an information signal such that the first local signal and the second local signal are modulated.

8. A radio wave control method comprising:

generating an information signal; and controlling, when a first local signal and a second local signal out of broadband local signals transmitted from a high power amplifier to a reflective plate are reflected by or transmitted through antenna elements periodically disposed on the reflective plate, directions in which a first modulated signal and a second modulated signal are beam-formed by electrically controlling the antenna elements on the basis of the information signal and controlling phases of the first local signal and the second local signal incident on the reflective plate;

modulating the first local signal by using a first information signal related to a first communication service provider at first timing, and modulating the second local signal by using a second information signal related to a second communication service provider at second timing different from the first timing.

9. The radio wave control method according to claim 8, further comprising:

controlling the phase of the first local signal that has been transmitted through first filter, the first filter transmitting the first local signal out of the broadband local signals output from the high power amplifier and controlling the phase of the second local signal that has been transmitted through second filter, the second filter transmitting the second local signal out of the broadband local signal output from the high power amplifier.

10. The radio wave control method according to claim 9, further comprising:

allocating each of the antenna elements disposed on the reflective plate to a first group or a second group, controlling the phase of the first local signal by using the antenna element allocated to the first group, and controlling the phase of the second local signal by using the antenna element allocated to the second group.

11. The radio wave control method according to claim 8, wherein an amplitude of the first local signal or the second local signal is controlled by using an information signal such that the first local signal and the second local signal are modulated.

12. The radio wave control method according to claim 8, wherein the high power amplifier is a traveling wave tube.

* * * * *